United States Patent
Dawani et al.

(10) Patent No.: US 12,273,415 B2
(45) Date of Patent: *Apr. 8, 2025

(54) MIRRORING NETWORK TRAFFIC OF VIRTUAL NETWORKS AT A SERVICE PROVIDER NETWORK

(71) Applicant: Amazon Technologies, Inc., Seattle, WA (US)

(72) Inventors: Anoop Dawani, Kirkland, WA (US); Nishant Mehta, Snoqualmie, WA (US); Richard H. Galliher, Seattle, WA (US); Lee Spencer Dillard, Seattle, WA (US); Joseph Elmar Magerramov, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/161,755

(22) Filed: Jan. 30, 2023

(65) Prior Publication Data

US 2023/0188598 A1   Jun. 15, 2023

Related U.S. Application Data

(63) Continuation of application No. 16/215,943, filed on Dec. 11, 2018, now Pat. No. 11,570,244.

(51) Int. Cl.
*H04L 67/1095* (2022.01)
*H04L 43/028* (2022.01)

(52) U.S. Cl.
CPC ........ *H04L 67/1095* (2013.01); *H04L 43/028* (2013.01)

(58) Field of Classification Search
CPC .......................... H04L 67/1095; H04L 43/028
See application file for complete search history.

(56) References Cited

U.S. PATENT DOCUMENTS 7,843,938 B1  11/2010  Sutter et al.
8,996,691 B1   3/2015  Stickle et al.
(Continued)

FOREIGN PATENT DOCUMENTS

CN   106911536 B   8/2019

OTHER PUBLICATIONS

Examination Report, EP App. No. 19829737.6, Sep. 21, 2021, 10 pages.

(Continued)

*Primary Examiner* — Emmanuel L Moise
*Assistant Examiner* — Xiang Yu
(74) *Attorney, Agent, or Firm* — Nicholson De Vos Webster & Elliott LLP

(57) ABSTRACT

Techniques are described that enable users to configure the mirroring of network traffic sent to or received by computing resources associated with a virtual network of computing resources at a service provider network. The mirrored network traffic can be used for many different purposes including, for example, network traffic content inspection, forensic and threat analysis, network troubleshooting, data loss prevention, and the like. Users can configure such network traffic mirroring without the need to manually install and manage network capture agents or other such processes on each computing resource for which network traffic mirroring is desired. Users can cause mirrored network traffic to be stored at a storage service in the form of packet capture (or "pcap") files, which can be used by any number of available out-of-band security and monitoring appliances including other user-specific monitoring tools and/or other services of the service provider network.

36 Claims, 10 Drawing Sheets

(56) References Cited

U.S. PATENT DOCUMENTS

| | | |
|---|---|---|
| 9,032,070 B1 | 5/2015 | Stickle et al. |
| 9,331,915 B1 | 5/2016 | Brandwine |
| 9,729,408 B2 | 8/2017 | Breslin et al. |
| 9,894,144 B2 | 2/2018 | Barabash et al. |
| 9,912,536 B2 | 3/2018 | McDaniel et al. |
| 2005/0063216 A1 | 3/2005 | Wilkins et al. |
| 2005/0278565 A1 | 12/2005 | Frattura et al. |
| 2013/0212263 A1* | 8/2013 | Breslin .................. H04L 43/04 709/224 |
| 2015/0106805 A1 | 4/2015 | Melander et al. |
| 2015/0163158 A1 | 6/2015 | Ryland |
| 2016/0182336 A1 | 6/2016 | Doctor et al. |
| 2016/0269318 A1 | 9/2016 | Su et al. |
| 2016/0294731 A1 | 10/2016 | McDaniel et al. |
| 2018/0006959 A1* | 1/2018 | Natu .................. H04L 67/1095 |
| 2018/0041524 A1 | 2/2018 | Reddy et al. |
| 2018/0145879 A1 | 5/2018 | Cook et al. |
| 2019/0116111 A1* | 4/2019 | Izard .................... H04L 45/745 |
| 2020/0076738 A1 | 3/2020 | Rao |
| 2020/0092299 A1* | 3/2020 | Srinivasan ............ H04L 63/105 |

OTHER PUBLICATIONS

Final Office Action, U.S. Appl. No. 16/215,943, Jun. 24, 2021, 25 pages.

International Search Report and Written Opinion, PCT App. No. PCT/US2019/065407, Mar. 3, 2020, 12 pages.

Non-Final Office Action, U.S. Appl. No. 16/215,943, Mar. 11, 2022, 20 pages.

Non-Final Office Action, U.S. Appl. No. 16/215,943, Nov. 18, 2020, 25 pages.

Notice of Allowance, U.S. Appl. No. 16/215,943, Sep. 27, 2022, 9 pages.

First Office Action, CN App. No. 201980081254.1, Jun. 19, 2023, 19 pages (10 pages of English Translation and 9 pages of Original Document).

* cited by examiner

MIRRORING NETWORK TRAFFIC OF VIRTUAL NETWORKS AT A SERVICE PROVIDER NETWORK

CROSS-REFERENCE TO RELATED APPLICATIONS

This application is a continuation of U.S. application Ser. No. 16/215,943, filed Dec. 11, 2018, which is hereby incorporated by reference.

BACKGROUND

Service provider networks provide users with the ability to utilize a variety of types of computing-related resources such as compute resources (for example, executing virtual machine (VM) instances or containers), data/storage resources, network-related resources, application resources, access policies or roles, identity policies or roles, machine images, routers and other data processing resources, and so forth. These and other computing resources can be provided as services, such as a hardware virtualization service that can execute compute instances, a storage service that can store data objects, and the like.

Users of some such service provider networks can create virtual networks in which users can provision logically isolated collections of computing resources within a service provider network. Users can customize the network configuration for such virtual networks, including the creation of public-facing and private-facing subnets, configuration of security groups and network access control lists, and so forth. The ability to manage and analyze the actual network traffic traversing such virtual networks for however presents several challenges.

BRIEF DESCRIPTION OF DRAWINGS

Various embodiments in accordance with the present disclosure will be described with reference to the drawings, in which.

DETAILED DESCRIPTION

Figure 1:
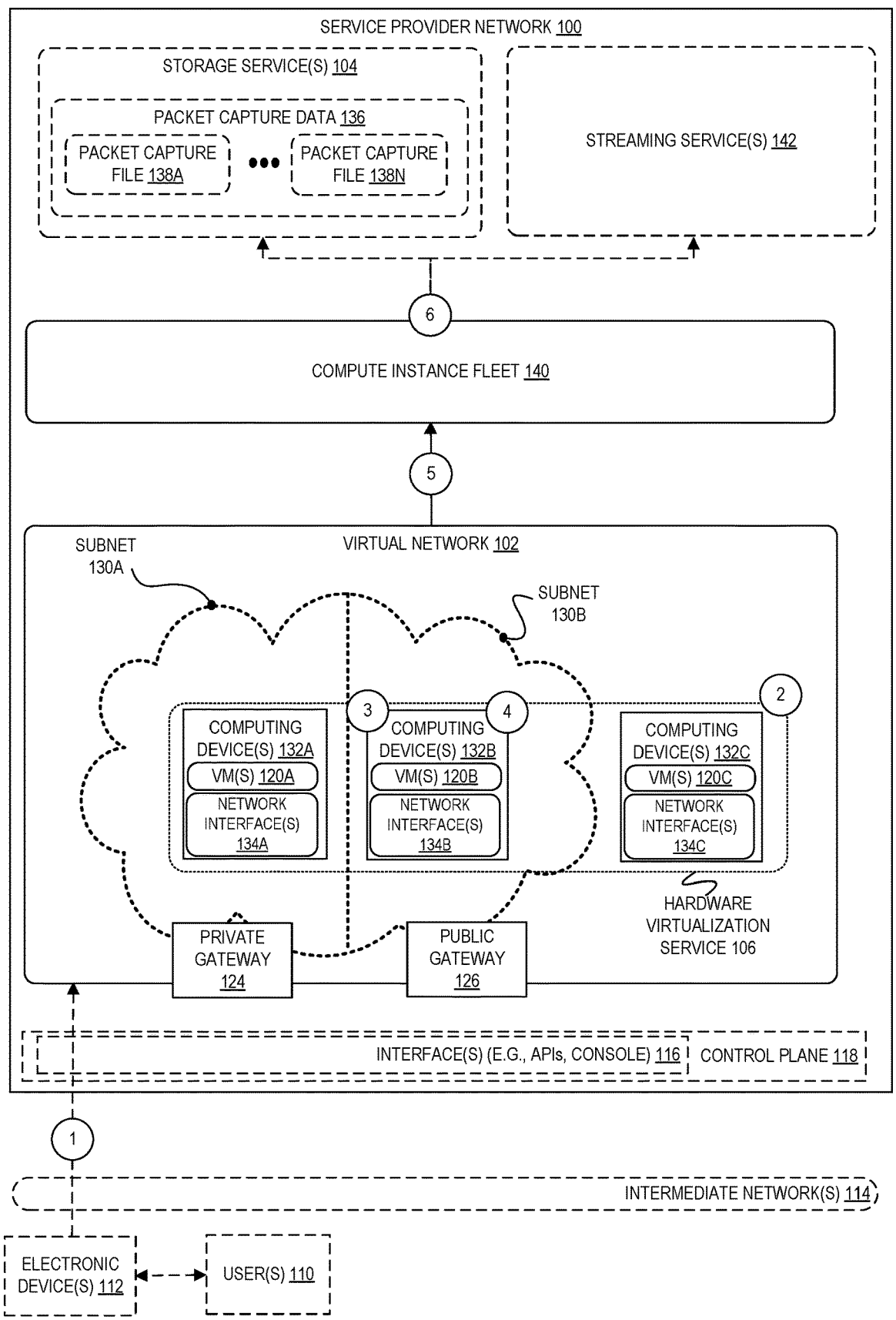
FIG. 1 is a diagram illustrating an environment for mirroring network traffic associated with virtual networks of a service provider network according to some embodiments.

Various embodiments of methods, apparatus, systems, and non-transitory computer-readable storage media are described that enable users to configure the mirroring of network traffic sent to or received by computing resources associated with a virtual network of computing resources at a service provider network. The ability to gain visibility into such network traffic associated with users' virtual networks can be beneficial for any of several desired purposes including, for example, network traffic content inspection, forensic and threat analysis, network troubleshooting, data loss prevention, and so forth. According to embodiments described herein, users can configure such network traffic mirroring relative to their virtual networks, including the mirroring of full payload data, without the need to manually install and manage network capture agents or other such processes on each computing resource for which network traffic mirroring is desired. In some embodiments, the mirrored network traffic is sent to a compute instance fleet that is designed to process the network traffic and to forward the processed data to one or more user-specified destinations, which can include various streaming and storage services. As one example, the processed network traffic can be stored at a storage service of a service provider network in the form of packet capture (or "pcap") files, which can be used by any number of other out-of-band security services, monitoring appliances, or any other services or applications.

A virtual network generally enables users to provision logically isolated collections of computing resources at a service provider network and to manage various related capabilities such as security services, firewalls, and intrusion detection systems. A virtual network may in some ways closely resemble a traditional network operated, for example, in a user's own on-premises data center. A virtual network can be logically isolated from other virtual networks associated with a same user account as well as those virtual networks associated with other user accounts of the service provider network.

In traditional data centers, network administrators can install various software agents or hardware devices to capture network traffic transmitted by devices in a network to detect various types of network and security issues. Embodiments described herein provide these and other types of network traffic monitoring features for computing resources of users' virtual networks at a service provider network. Computing devices that implement computing resources within a user's virtual network can be configured to create a mirrored copy of select network traffic and to send the mirrored network traffic to a user-specified destination. In some examples, users can cause the mirrored traffic to be stored at storage resources provided by the service provider network and at which users can retrospectively analyze the mirrored network traffic. Users could optionally run individual agents on their compute instances in a virtual network to perform basic network traffic mirroring; however, the configuration of agents at individual compute instances fails to scale well, particularly as users' virtual networks may grow to include hundreds, thousands, or even more compute instances.

Embodiments described herein enable users to easily configure their compute instances and other service provider network-managed resources such as load balancers, internet gateways, network address translation (NAT) gateways, and so forth, to mirror network traffic according to user configurations. As indicated above, for example, network traffic can be mirrored to a compute instance fleet that processes the data and can route the mirrored network traffic to one or more streaming services, storage services, or other user-specified destinations for further processing and analysis. The processing by the compute instance fleet can include the addition of various types of metadata and/or conversion of the network traffic into packet capture files or into any other representation of network traffic. The stored packet capture data or data streamed from the compute instance fleet can be used by multiple tools and algorithms (including, for example, machine learning (ML) based tools) to detect potential network or security related issues. Among other benefits, the ability to configure such traffic mirroring enables users to easily monitor network traffic associated with their virtual networks at service provider networks and provides a consistent way to access, categorize, and consolidate the delivery of network traffic to any type of destination, including out-of-band security and monitoring tools or other services available at a service provider network.

FIG. 1 is a block diagram illustrating an environment that enables users to configure the mirroring of network traffic sent to or received by computing resources associated with a virtual network of computing resources at a service provider network. In some embodiments, a hardware virtualization service 106 and a storage/streaming service(s) 104, among any number of other possible services, operate as part of a service provider network 100 and each comprises one or more software modules executed by one or more electronic devices at one or more data centers and geographic locations. A user 110 using one or more electronic device(s) 112 (which may be part of or separate from the service provider network 100) can interact with the various services of the service provider network 100 via one or more networks, such as the internet.

A service provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of provider networks 100 may utilize one or more user accounts that are associated with a customer account, though these terms may be used somewhat interchangeably depending upon the context of use. Users may interact with a provider network 100 across one or more intermediate networks 114 (for example, the internet) via one or more interface(s) 116, such as through use of application programming interface (API) calls, via a console implemented as a website or application, etc. The interface(s) 116 may be part of, or serve as a front-end to, a control plane 118 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a user has configured a virtual network 102 at the service provider network 100. As indicated above, a virtual network 102 represents a network in which a user of the service provider network can provision a logically isolated set of computing resources. To establish a virtual network 102, a user can allocate one or more computing resources (for example, VMs 120A-120C) to the virtual network 102. In some embodiments, a virtual network 102 can include any number of other types of resources including containers, block storage, databases, network-related resources, and so forth. A range of public IP addresses can also be allocated to the virtual network 102 and one or more networking nodes (for example, routers, switches, and so forth) of the provider network 100 can be allocated to the virtual network 102. In some embodiments, a virtual network 102 can include one or more of a private gateway 124 and include a public gateway 126, which enables computing resources within the virtual network 102 to communicate directly with entities via intermediate networks 114, and vice versa, instead of or in addition to via a private communications channel.

In an embodiment, a virtual network 102 can be optionally subdivided into two or more subnetworks, or subnets, 130A, 130B. For example, in implementations that include both a private gateway 124 and a public gateway 126, a virtual network 102 can be subdivided into a subnet 130A that includes resources (VM 120A, in this example) reachable through private gateway 124, and a subnet 130B that includes resources (VM 120B, in this example) reachable through public gateway 126.

In an embodiment, a user can assign allocated public IP addresses to resources in a virtual network 102. A network entity on an intermediate network 114 can then send traffic to a public IP address published by the user; the traffic is routed, by the service provider network 100, to the associated compute instance. Return traffic from the compute instance is routed, by the service provider network 100, back to the network entity over intermediate network 114. Note that routing traffic between a compute instance and the network entity may require network address translation to translate between the public IP address and the local IP address of the compute instance.

In an embodiment, each computing resource of a user's virtual network 102 can be associated with one or more virtual network interfaces (for example, the VMs 120A running at computing device(s) 132A hosting VMs 120A can be associated with one or more virtual network interfaces 134A, the VMs 120B running at computing device(s) 132B hosting VMs 120B can be associated with one or more virtual network interfaces 134B, and the VMs 120C running at computing device(s) 132C hosting VMs 120C can be associated with one or more virtual network interfaces 134C). A virtual network interface is a logical networking component of a virtual network 102 that represents a virtual network card. These virtual network interfaces can be created in association with a user's account and attached to VMs in a user's virtual network 102. Virtual network interfaces can also be detached from compute instances and attached to other compute instances, where the attributes of a network interface follow it as it's attached or detached from various instances. In some embodiments, users can also modify the attributes of a virtual network interface, including changing its security groups and managing IP addresses associated with the interface.

In some embodiments, virtual network interfaces can be implemented at least in part at one or more offload cards (which include one or more processors, and possibly include one or more physical network interfaces) that are connected to computing devices 132A-132C using an I/O interface (for example, a bus implementing a version of the Peripheral Component Interconnect—Express (PCI-E) standard, or another interconnect such as a QuickPath interconnect (QPI) or UltraPath interconnect (UPI)). For example, in some embodiments the computing devices 132A-132C host compute instances (for example, VMs 120A-120C), and the one or more offload cards execute a virtualization manager and other software that can manage compute instances and associated virtual network interfaces at the host electronic device. As an example, in some embodiments the offload card(s) can perform compute instance management operations such as pausing and un-pausing compute instances, launching and terminating compute instances, performing memory transfer/copying operations, routing network traffic, and so forth. In some embodiments, these management operations are performed by the offload card(s) in coordination with a hypervisor (for example, upon a request from a hypervisor) that is executed by other processors of a computing device. However, in some embodiments, the virtualization manager implemented by the offload card(s) can accommodate requests from other entities (for example, from compute instances themselves) and may not coordinate with or service any separate hypervisor.

According to embodiments described herein, one configurable attribute of a virtual network interface is whether to enable mirroring of network traffic traversing the network interface (that is, network traffic either received or being sent by the network interface). As indicated above, it is sometimes desirable for users to enable mirroring of network traffic associated with computing resources of a virtual network for any of several reasons including, for example, content inspection, forensic and threat analysis, network troubleshooting, and so forth. At the circle labeled "1" in FIG. 1, a hardware virtualization service, or any other service used to manage virtual networks at the service provider network, receives a request to enable a traffic mirroring session at one or more virtual network interfaces associated with a virtual network of a service provider network. In some embodiments, the request can be received via an application programming interface (API), command-line interface (CLI), web-based console, or any other interface provided by the service. In an embodiment, a request to create a traffic mirroring session identifies one or more source virtual network interfaces (that is, where to perform the requested network traffic mirroring), one or more destinations (that is, where the mirrored network traffic is to be sent), optional filters identifying what types of network traffic is to be mirrored (for example, only ingress or egress traffic, only traffic associated with particular protocols, and so forth), among other possible parameters.

In one embodiment, the source(s) identified in a network traffic mirroring request can include one or more of: one or more identified virtual network interfaces (for example, identified by a user based on identifiers associated with the virtual network interfaces), one or more identified subnets of a virtual network, an entire virtual network, public or private gateways, based on metadata identifying a set of virtual network interfaces (for example, based on one or more "tags" associated with virtual network interfaces in a user's account), or any combinations thereof. The identified virtual network interfaces, for example, can be associated with various compute instances (for example, any of VMs 120A-120C), public or private gateways, load balancers, NAT gateways, or any other computing resources within a virtual network 102. In some embodiments, users can request to mirror network traffic traversing particular network paths, for example, only network traffic traversing a public gateway or private gateway of a virtual network.

In an embodiment, a received request can alternatively be a request to stop, pause, restart, or delete a previously created network traffic mirroring session at one or more virtual network interfaces. In some embodiments, a request can instead be a request to modify an existing network traffic mirroring session, for example, to modify the existing session to include or remove previously identified mirroring sources, to change, add, or remove a destination for the mirrored network traffic, or to modify any other attribute associated with a previously created network traffic mirroring session. In these examples, a service of the service provider network receiving such a request can generate additional configuration data that is sent to the relevant computing devices causing the computing devices to carry out the requested operation(s) relative to the identified traffic mirroring session(s).

In an embodiment, a request to create a network traffic mirroring session can specify network traffic filtering options. For example, filtering options can be used to identify types of network traffic that a user desires to have mirrored, where only network traffic matching a defined filter is mirrored by the relevant computing devices. In other examples, filters can additionally or alternatively be used to exclude selected types of network traffic from being mirrored. Filtering rules that can be specified in a network traffic mirroring request can include, for example, a filter to mirror only inbound traffic received by one or more virtual network interfaces, or to mirror only outbound traffic, or only network traffic associated with specified protocols (for example, only TCP, HTTP, or DNS traffic), only traffic associated with specified source ports, only traffic sent to specified destination IP ranges, only traffic sent to specified destination port(s), and so forth. The following is an example of a command that can be used to create a network traffic mirroring session, including the specification of mirroring source(s), destination(s), and various types of filters: "create-vpc-traffic-mirror--vpc-id<vpc-id>--mirror-source <mirror-source-ARN, IGW, VGW, Subnet, VPC>--mirror-destination <storage-bucket>[--traffic-direction <--ingress, egress, both>--snap-length <1-65535>--Protocol <TCP, UDP, Any>--source-IP<IP address>--source port <port number>>--destination-IP<IP address>--destination port <port number>--time-limit <seconds>--capture-frequency <seconds>]."

As another example use of filters, a user can specify a filter defining set of network addresses that the user desires their resources not to receive network traffic from. When this example filter matches, only packets received from the defined set of network addresses may be mirrored. As another particular example, an employee of an organization might be associated with an IP address and an administrator desires to know whenever that employee initiates an SSH connection into any instances of a particular subnet. That mirrored traffic can be sent to a destination, for example, that causes the administrator to receive a notification when such traffic is detected. As yet another example, a filter can be configured to mirror network traffic received from certain specified geographic regions and a destination of the mirrored traffic can be configured to update various security group rules in response.

In an embodiment, if a user requests to mirror network traffic associated with an entire virtual network 102, for example, the customer can further specify whether the user desires to mirror only intra-network traffic, only inter-network traffic, or both. Similarly, a request to mirror network traffic associated with one or more identified subnets (for example, subnets 130A, 130B) can include an indication to mirror only intra-subnet traffic, only-inter network traffic, or both.

In one embodiment, in examples where the destination is a storage service 104 used to store packet capture files created from the mirrored network traffic, a user can specify one or more storage locations (for example, one or more storage "buckets") at the storage service 104 at which to store the created packet capture files. In other examples, a default storage location can be created at the storage service 104 if a user does not explicitly identify a storage location as part of the request.

In some embodiments, a network traffic mirroring request optionally can further specify a snapshot length indicating an amount of each network packet to capture (for example, the specified length can be from 1 byte to 65535 bytes), a time limit for the mirroring session (for example, a default may be 600 seconds and a value of 0 can be specified to disable the time limit), a capture frequency specifying the frequency of packet capture (for example, a value of 60 may indicate that the network traffic data is captured into separate files each having 60 seconds of captured network packets, where any amount of time is possible), and a maximum capture file size (for example, a user can specify a maximum size of each packet capture file before a new file is created), a triggering condition to initiate the mirroring session (for example, a pattern or type of network traffic that, once identified at a virtual network interface, causes the interface to start mirroring network traffic).

At the circle labeled "2," a hardware virtualization service processes the request at least in part by identifying a set of computing devices associated with the virtual network interfaces identified by the request, and generating configuration information used to configure the identified computing devices. In one embodiment, the request is processed by a hardware virtualization service 106 or any other service that manages the virtual network 102. For example, if the network traffic mirroring request received at circle "1" identifies one or more particular virtual network interfaces (for example, virtual network interface(s) 134A) associated with the virtual network 102, the hardware virtualization service 106 can identify computing devices (for example, computing device(s) 132A) hosting VMs to which the particular virtual network interfaces are attached. The identification of the computing devices can be based, for example, on mapping information maintained by the hardware virtualization service 106 associating each virtual network interface with a compute instance and host computing device to which the virtual network interface is attached.

If the user instead requests to mirror network traffic associated with an entire subnet or entire virtual network 102, the hardware virtualization service 106 determines which computing devices are associated with virtual network interfaces in the virtual network to which to send the configuration. For example, the hardware virtualization service 106 may store mapping information indicating computing device-virtual network pairs and, based on the mapping, the service can determine which computing devices manage interfaces for the relevant subnetwork(s) or the entire virtual network. In an embodiment, the hardware virtualization service 106 creates configuration information for each computing device with at least one relevant virtual network interface attached, where the configuration information causes the computing device to configure the relevant interfaces to mirror network traffic according to the configuration. As indicated above, the configuration information can include user-specified configuration options including, for example, which source interfaces are to mirror network traffic, which destination interfaces are to receive the mirrored network traffic, properties of those destinations, optional filtering configurations, among other possible parameters.

At the circle labeled "3," an example computing device receives the configuration information and configures one or more virtual network interfaces associated with the computing device to mirror network traffic according to the configuration information generated at circle "2." As indicated above, in some embodiments, the configuration of the network traffic mirroring at a computing device can include configuring an offload card of the computing device to mirror network traffic sent to or received by the computing device according to the configuration. In other examples, the configuring can additionally or alternatively include configuring one or more components of a hypervisor, VM, or other applications running on the computing device to perform the mirroring. Although the example in FIG. 1 shows a single computing device receiving configuration information, such configuration information may be received by and used to configure any number of computing devices in a virtual network 102 depending on the source(s) identified in the initial request.

At the circle labeled "4," the computing device configured to mirror network traffic sends or receives network traffic and creates a mirrored copy of the network traffic according to the configuration received at circle "3." The network traffic generally can include any type of network traffic sent to or received by any application or process executing on the computing device, including network traffic sent to or received by any user compute instances or applications running at the computing device.

As indicated above, computing devices generally can be configured to mirror network traffic traversing one or more particular virtual network interfaces according to any defined filters and other user-specified configurations. In one embodiment, the mirroring of the network traffic generally includes creating a copy of the received/sent network packets, for example, at an offload card of the computing device. In some embodiments, creating the mirrored copy of the network traffic can further include creating an encapsulation layer that provides additional information about the mirrored network traffic including, for example, identifiers of the associated virtual network interface, virtual network, VM, user, network mirroring session, and so forth. As described below, these identifiers can be used by various further processing steps that receive the mirrored network traffic.

At the circle labeled "5," the computing device sends the mirrored copy of the network traffic, including any additional metadata, to one or more destination network locations identified in the configuration information. According to one embodiment, the mirrored copy of the network traffic is sent to a compute instance fleet 140 that optionally perform one or more operations relative to the mirrored network traffic and route the mirrored traffic to a user-specified destination. The destination for the mirrored network traffic, for example, can be one or more of: one or more user-specified network locations (for example, a network address corresponding to a virtual network interface attached to another compute instance within the service provider network 100), one or more services of the service provider network, one or more internal or external applications, or any other network-accessible location. As shown in the example of FIG. 1, the mirrored network traffic can optionally be sent to one or more storage service(s) 104 or streaming service(s) 142 of the service provider network.

At the circle labeled "6," a compute instance fleet processes and routes the mirrored network traffic to one or more destinations. For example, the compute instance fleet 140 can convert the mirrored network traffic data to packet capture data 136 (including, for example, packet capture files 138A-138N) to be stored at one or more storage locations at a storage service 104 associated with the corresponding users of the service provider network. In some embodiments, to enable the compute instance fleet 140 to scale as an amount of mirrored network traffic increases or decreases over time, the fleet of compute instances can be associated with one or more auto scaling groups, network load balancers, and other possible components that distribute the received network traffic over the available compute instances of the fleet. In one embodiment, processing the mirrored network traffic can include identifying configuration information associated with the mirrored network traffic (for example, based on one or more identifiers included in the mirrored network traffic), optionally adding additional metadata to the mirrored network traffic, converting the network traffic to a different format (for example, converting the network packets to packet capture data), compressing the data, encrypting the data, or performing any other operations on the received mirrored traffic.

As indicated above, the processing of the mirrored network traffic by the compute instance fleet 140 can include converting the mirrored network traffic into packet capture data. The packet capture data generally can include any file format that can be used by various network traffic analysis, network security, or other types of applications. For example, the packet capture data can be formatted as binary data that can be processed by particular types of applications, or formatted in any of various plain-text formats such as CSV files or any other data format that can be used to represent network traffic information. Although the example of FIG. 1 shows the network traffic being sent to storage service(s) 104 and/or streaming service(s) 142, as described below, the network traffic can be sent additionally or alternatively to any number of other types of services or applications including, for example, a network threat intelligence service, and so forth.

Figure 2:
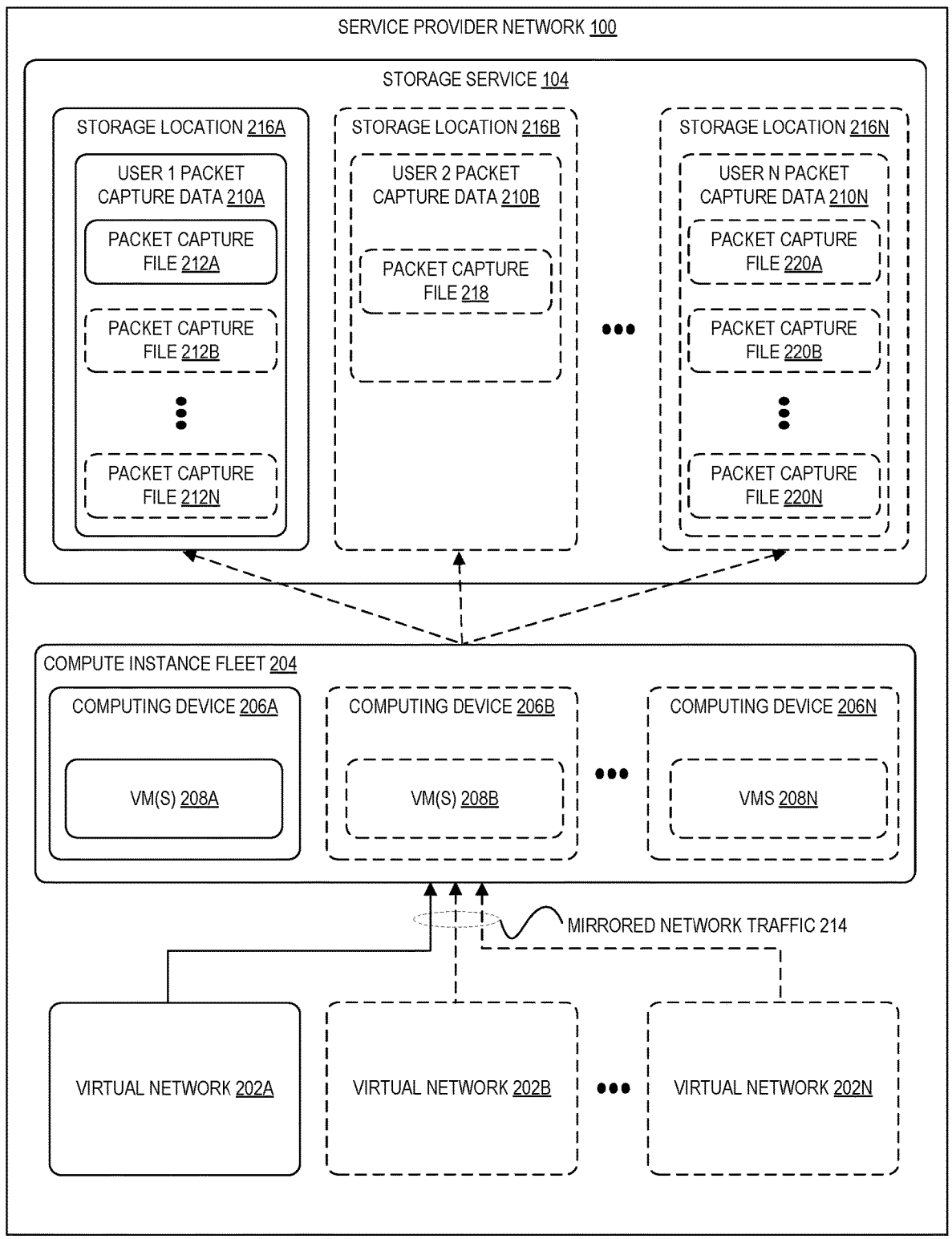
FIG. 2 is a diagram illustrating components of a compute instance fleet used to process network traffic mirrored from users' virtual networks at a service provider network according to some embodiments.

FIG. 2 is a diagram illustrating a compute instance fleet used to process network traffic mirrored from users' virtual networks at a service provider network according to some embodiments. As shown in FIG. 2, a compute instance fleet 204 can be implemented to receive mirrored network traffic 214 from any number of computing devices associated with any number of virtual networks 202A-202N within a service provider network 100. The compute instance fleet 204 can include any number of computing devices 206A-206N each hosting any number of VMs 208A-208N, where the size of the fleet 204 can be scaled according to an amount traffic being received from the virtual networks 202A-202N or based on amount of traffic expected to be received in the future.

In an embodiment, the compute instance fleet 204 processes mirrored network traffic that it receives according to configuration information associated with the mirrored network traffic. For example, the compute instance fleet can analyze the mirrored network traffic to identify configuration information associated with the traffic. The configuration information can be identified based on one or more identifiers included with the mirrored network traffic such as, for example, user account identifiers, virtual network identifiers, virtual network interface identifiers, IP addresses, and so forth. The configuration information can be obtained periodically by the compute instance fleet from another service at which the network traffic mirroring is configured.

In an embodiment, the processing of the mirrored network traffic received by the compute instance fleet can include modifying and/or supplementing the mirrored network traffic, and routing the mirrored network traffic to one or more user-specified destinations (for example, a data storage service, a data streaming service, an application, and so forth). The modifying and/or supplementing of the mirrored network traffic can include, for example, converting the mirrored network traffic into another data format (into network packet files, for example), segmenting the mirrored network traffic, aggregating two or more separate network traffic streams, removing or modifying portions of the mirrored network traffic, adding metadata to the mirrored network traffic, or any other operations specified by the configuration information. The compute instance fleet can also route the mirrored network traffic, or the processed version thereof, to one or more destinations as specified by the configuration information.

As shown in FIG. 2, in one example, the mirrored network traffic 214 is processed by the compute instance fleet 204 and converted into packet capture data, where the packet capture data is stored at separate storage locations 216A-216N associated with separate user accounts at the service provider network. For example, user 1 packet capture data 210A is stored at a storage location 216A that is associated with a first user account, while user 2 packet capture data 210B is stored at a separate storage location 216B that is associated with a second user account, where each storage location can be associated with various access rules to prevent unauthorized access to the data. The compute instance fleet 204 can determine where to store received network traffic based on identifiers associated with the network traffic (for example, user account identifiers, virtual network interface identifiers, virtual network identifiers, and so forth).

As indicated above, in one embodiment, the packet capture files (for example, packet capture files 212A-212N, 218, and 220A-220N) can include additional fields for metadata including information about the source of the mirrored network traffic. For example, the metadata included with the packet capture files can include one or more of: a virtual network identifier (for example, from which of the virtual networks 202A-202N was the network traffic received), a user account identifier associated with the network traffic, a virtual network interface identifier, a compute instance identifier, a container/task identifier, tags associated with compute instances, and identifiers of filters used to capture the traffic. In one embodiment, users can specify lifecycle configurations at a storage service 104 to manage the lifecycle of stored packet capture data.

In some embodiments, the data stored at a storage service 104 can be queried directly via the storage service. For example, the storage service 104 can include functionality that enables users to view and query packet capture data or other data formats stored at the storage service 104. The ability to query the data stored at the storage service 104 directly, for example, enables users to do so without having to export the data to another data storage location such as a database where the data can be queried. A user can, for example, use the storage service 104 to query for all packets of a certain size that have a specified destination IP address, or query for network traffic that was sent to specified geographic regions, traffic associated with a particular protocol, traffic sent or received within a particular timeframe, and so forth.

Figure 3:
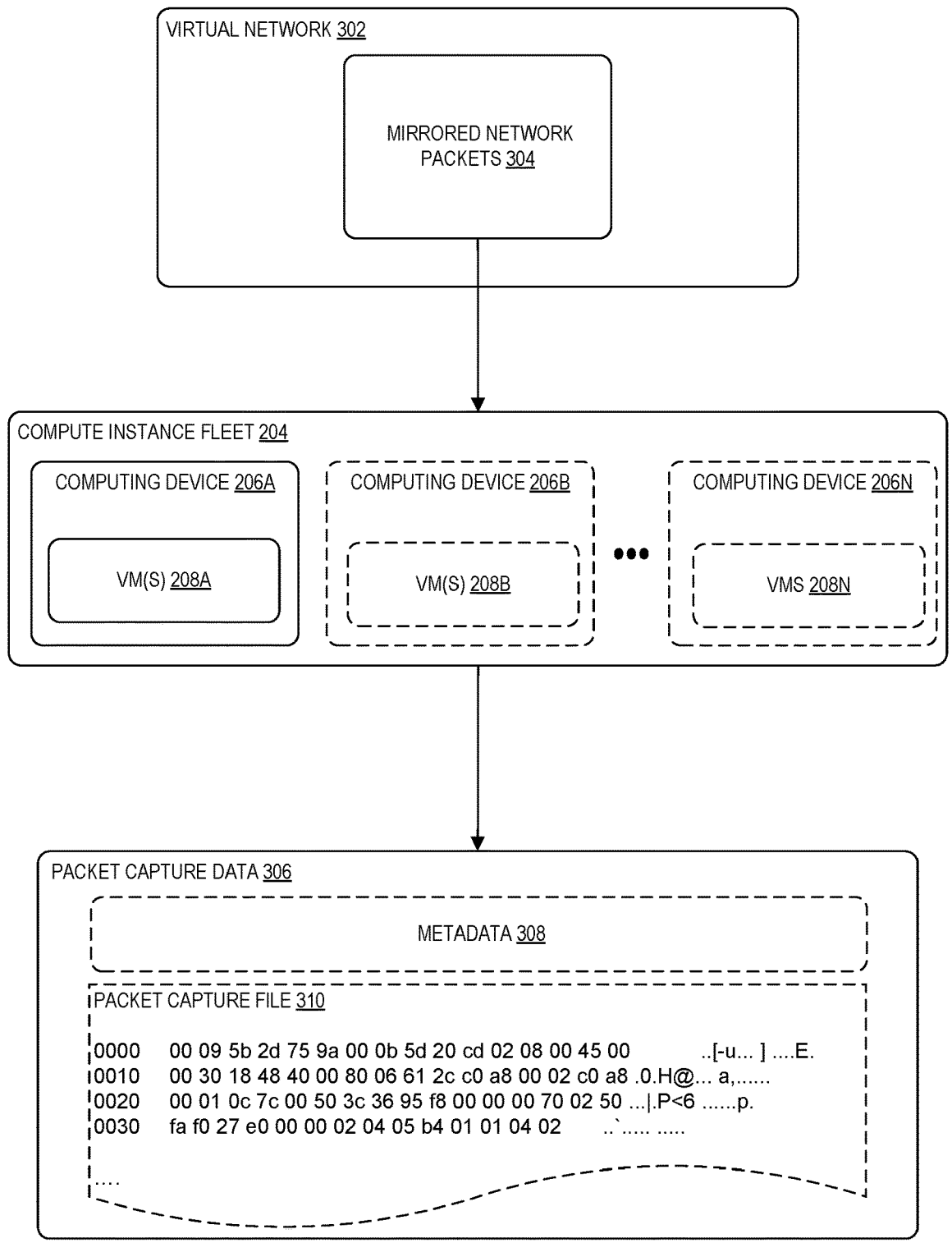
FIG. 3 illustrates an example of a compute instance fleet converting mirrored network traffic to packet capture data according to some embodiments.

FIG. 3 illustrates an example of converting mirrored network traffic to packet capture data according to some embodiments. As shown in FIG. 3, mirrored network packets 304 are sent from computing devices associated with a virtual network 302 to a compute instance fleet 204, as described in relation to FIG. 2. FIG. 3 further illustrates the conversion of the mirrored network packets 304 into packet capture data 306. As shown, the packet capture data 306 generally can be formatted in any binary or plain-text format that represents the network packets contained in the mirrored network packets 304 (for example, represented by packet capture file 310). In some embodiments, a user can specify a type of packet capture data 306 the user desires to use as part of the initial traffic mirroring request. In an embodiment, the processing of the mirrored network packets 304 can further include the creation of metadata 308 to be stored in association with the packet capture data. The metadata 308 can be used, for example, by any other services or applications to which the mirrored network traffic is ultimately routed by the compute instance fleet 204.

Figure 4:
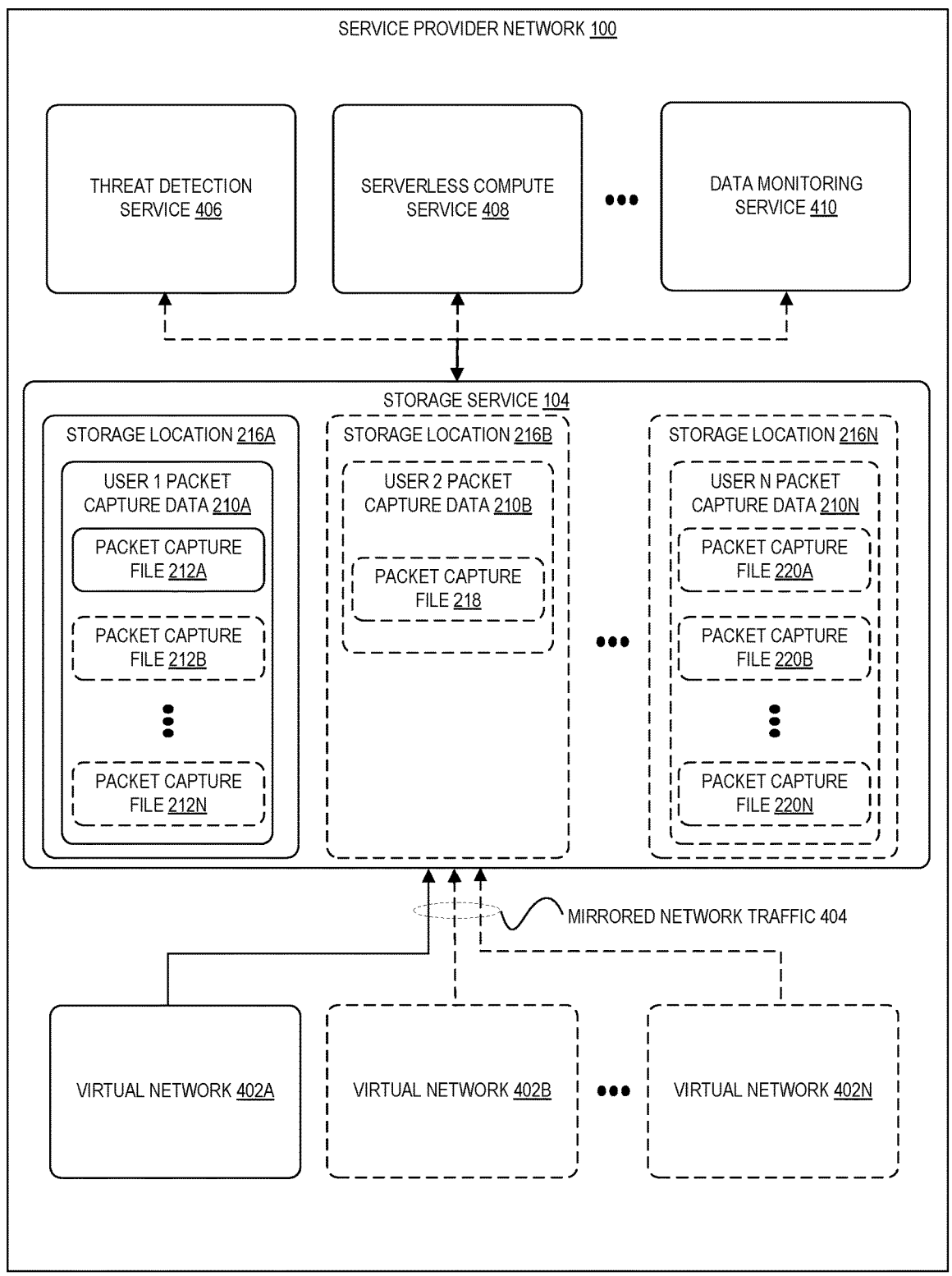
FIG. 4 is a diagram illustrating the use of various ancillary services of a service provider network to process and analyze packet capture data stored at a storage service according to some embodiments.

FIG. 4 is a diagram illustrating the use of various services of a service provider network to process and analyze packet capture data stored at a storage service. In FIG. 4, mirrored network traffic 404 is sent from one or more virtual networks 402A-402N of a service provider network 100 to a compute instance fleet (not shown in FIG. 4) that routes the mirrored network traffic to a storage service 104. As described above, the compute instance fleet can convert the mirrored network traffic 404 into packet capture files and store the packet capture files at storage locations associated with various users of the service provider network 100.

In an embodiment, the storage of the packet capture data at the storage service 104 enables the data to be used by any of a number of other applications or services of a service provider network including, for example, a threat detection service 406, a serverless compute service 408, a data monitoring service 410, among other possible services. These various services can be used to perform forensic and threat analysis on the stored, to analyze traffic patterns, to perform responsive security or network configuration actions, among many other possible configurable actions.

Figure 5:
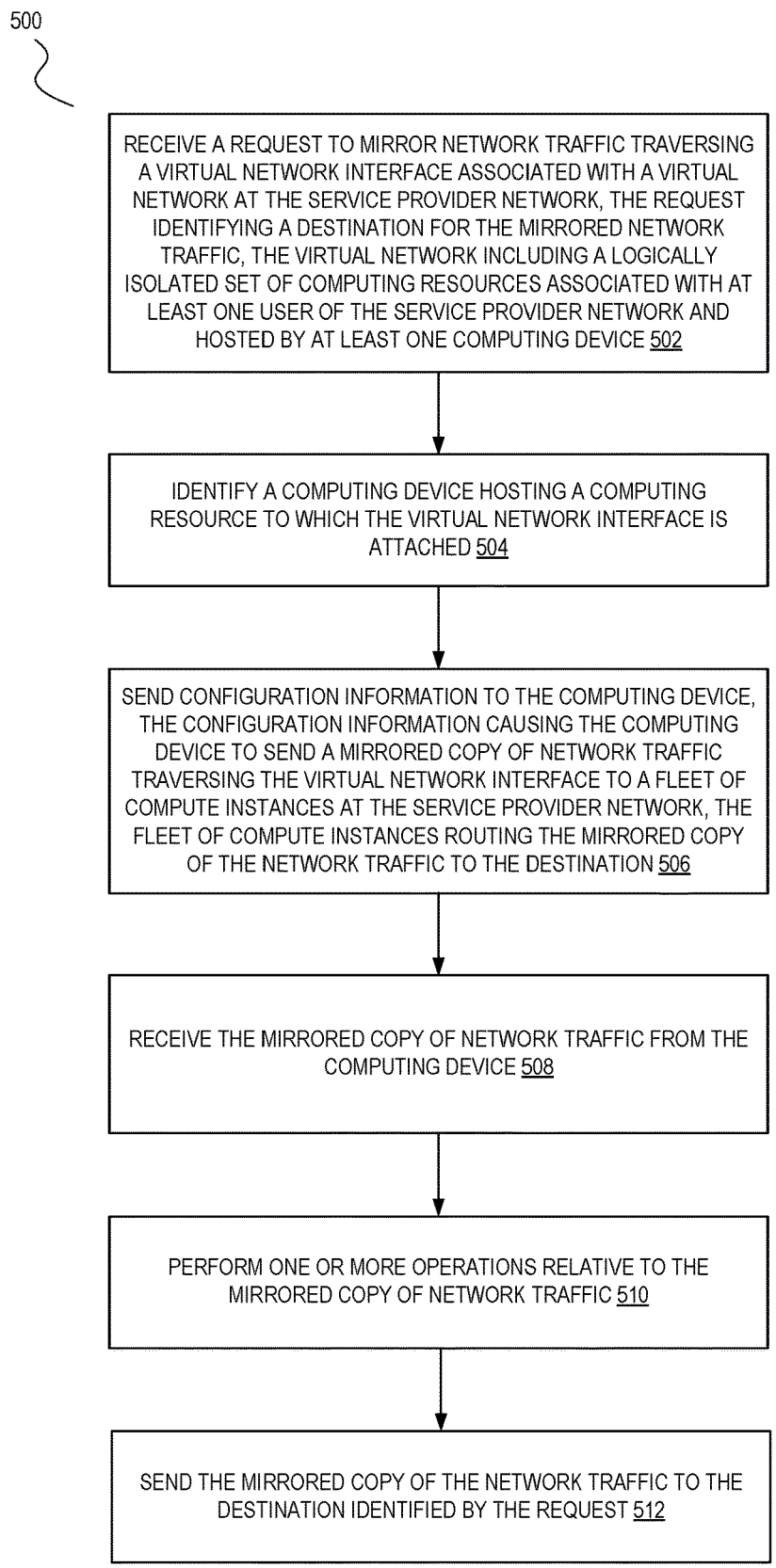
FIG. 5 is a flow diagram illustrating operations of a method for enabling users to mirror network traffic associated with a virtual private network at a service provider network according to some embodiments.

FIG. 5 is a flow diagram illustrating operations 500 of a method for enabling users to mirror network traffic associated with virtual networks of a service provider network according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a hardware virtualization, storage service, and/or other components of the other figures.

The operations 500 include, at block 502, receiving a request to mirror network traffic traversing a virtual network interface associated with a virtual network at the service provider network, the request identifying a destination for the mirrored network traffic, and the virtual network including a logically isolated set of computing resources associated with at least one user of the service provider network and hosted by at least one computing device. In one embodiment, the virtual network interface is one of a group of virtual network interfaces identified in the request to mirror the network traffic, where the group corresponds to one or more of: a set of identified virtual network interfaces, one or more computing resources of the virtual network, a subnetwork of the virtual network, the entire virtual network, a set of virtual network interfaces associated with a specified tag. Network traffic traversing a virtual network interface can include network traffic sent to and/or received by a virtual network interface depending on the request.

In one embodiment, the one or more operations include one or more of: adding metadata to the mirrored copy of the network traffic, converting the mirrored copy of the network traffic to a packet capture data format, and wherein the destination is one or more: a storage service, a streaming data service, a security service, an application. In one embodiment, the destination is a storage service of the service provider network, and wherein the fleet of compute instances coverts the mirrored copy of the network traffic into one or more packet capture files and stores the one or more packet capture files and stores the one or more packet capture files at one or more storage locations at the storage service associated with at least one user of the service provider network. In one embodiment, the fleet of compute instances receives network traffic mirrored from a plurality of virtual networks associated with a plurality of different users of the service provider network.

In one embodiment, the request further specifies at least one filter identifying selected types of network traffic to mirror, and wherein the computing device mirrors only network traffic matching the at least one filter to the fleet of compute instances. In one embodiment, the request further specifies one or more of: a triggering condition indicating when to begin mirroring the network traffic, and a time limit for mirroring the network traffic.

The operations 500 further include, at block 504, identifying a computing device hosting a computing resource to which the virtual network interface is attached.

The operations 500 further include, at block 506, sending configuration information to the computing device, the configuration information causing the computing device to send a mirrored copy of network traffic traversing the virtual network interface to a fleet of compute instances at the service provider network, the fleet of compute instances routing the mirrored copy of network traffic to the destination.

The operations 500 further include, at block 508, receiving, by the fleet of compute instances, the mirrored copy of network traffic from the computing device.

The operations 500 further include, at block 510, performing one or more operations relative to the mirrored copy of network traffic. In one embodiment, the one or more operations include one or more of: adding metadata to the mirrored copy of the network traffic, converting the mirrored copy of the network traffic to a packet capture data format, and wherein the destination is one or more of: a storage service, a streaming data service, a security service, an application.

The operations 500 further include, at block 512, sending the mirrored copy of the network traffic to the destination identified by the request.

In an embodiment, the operations further include receiving an additional request to perform one or more of: stopping the mirroring of network traffic, pausing the mirroring of network traffic, resuming the mirroring of network traffic, modifying the mirroring of network traffic. In one embodiment, the operations further include scaling the fleet of compute instances based on an amount of mirrored traffic received by the fleet of compute instances.

Figure 6:
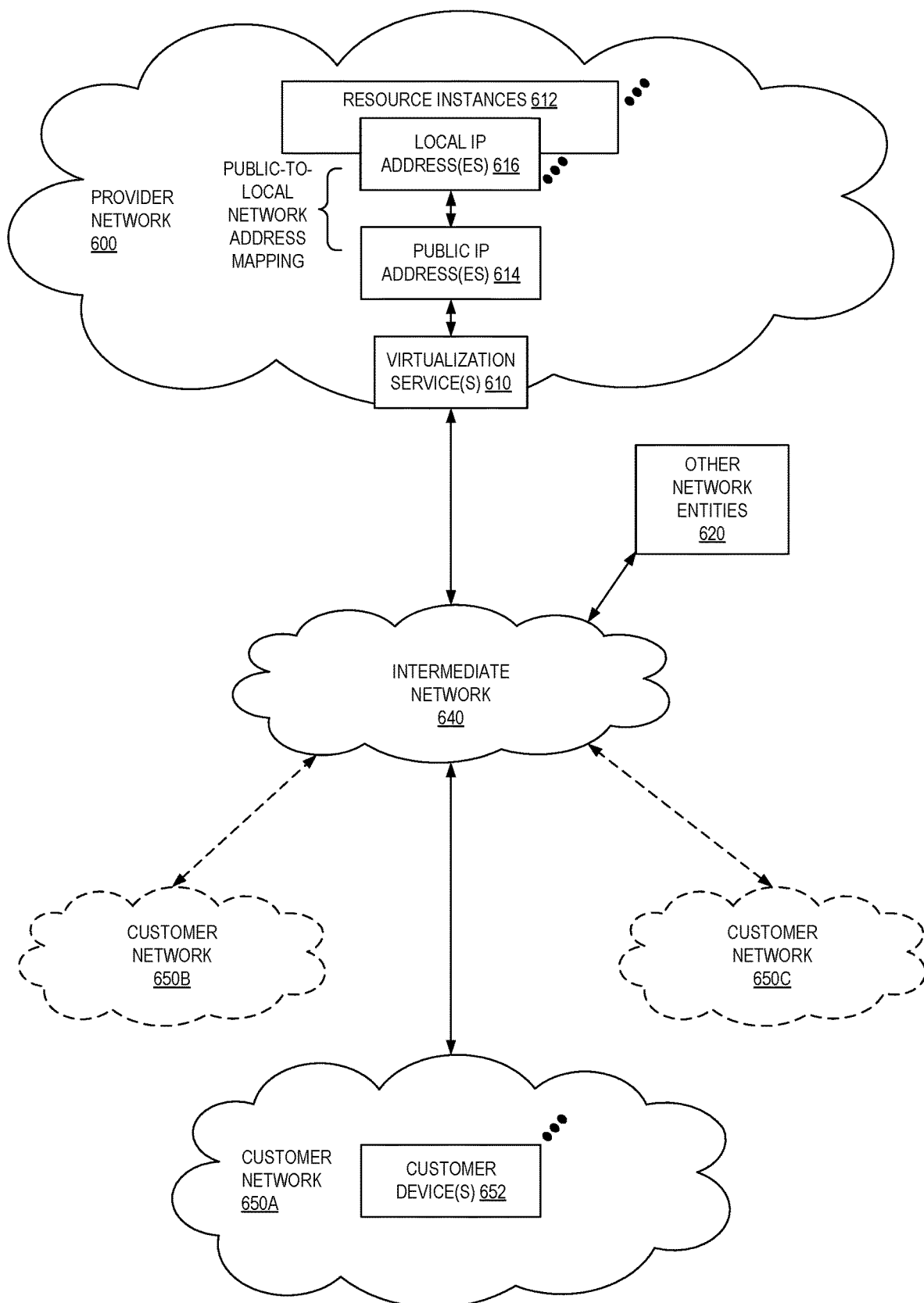
FIG. 6 illustrates an example service provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
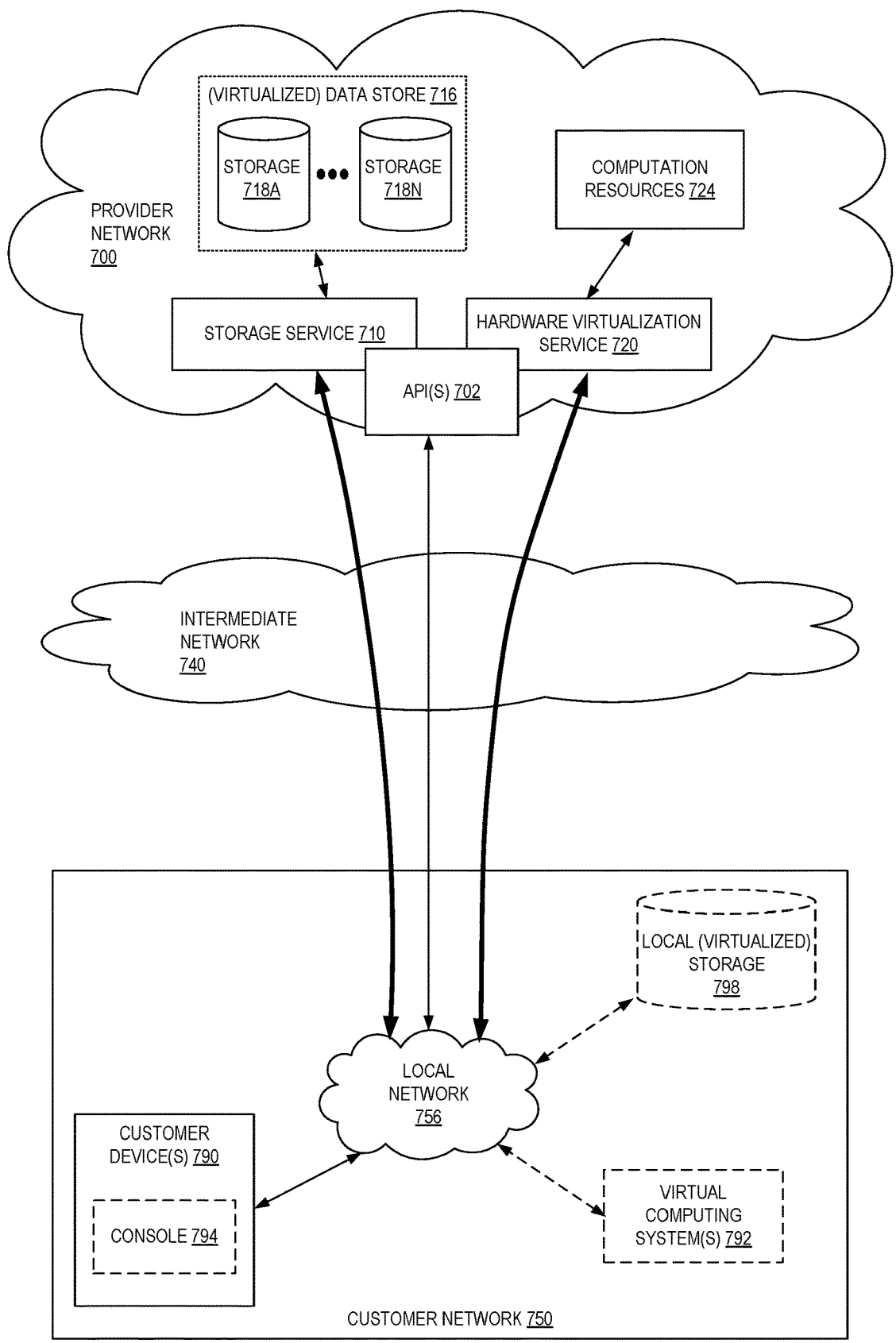
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
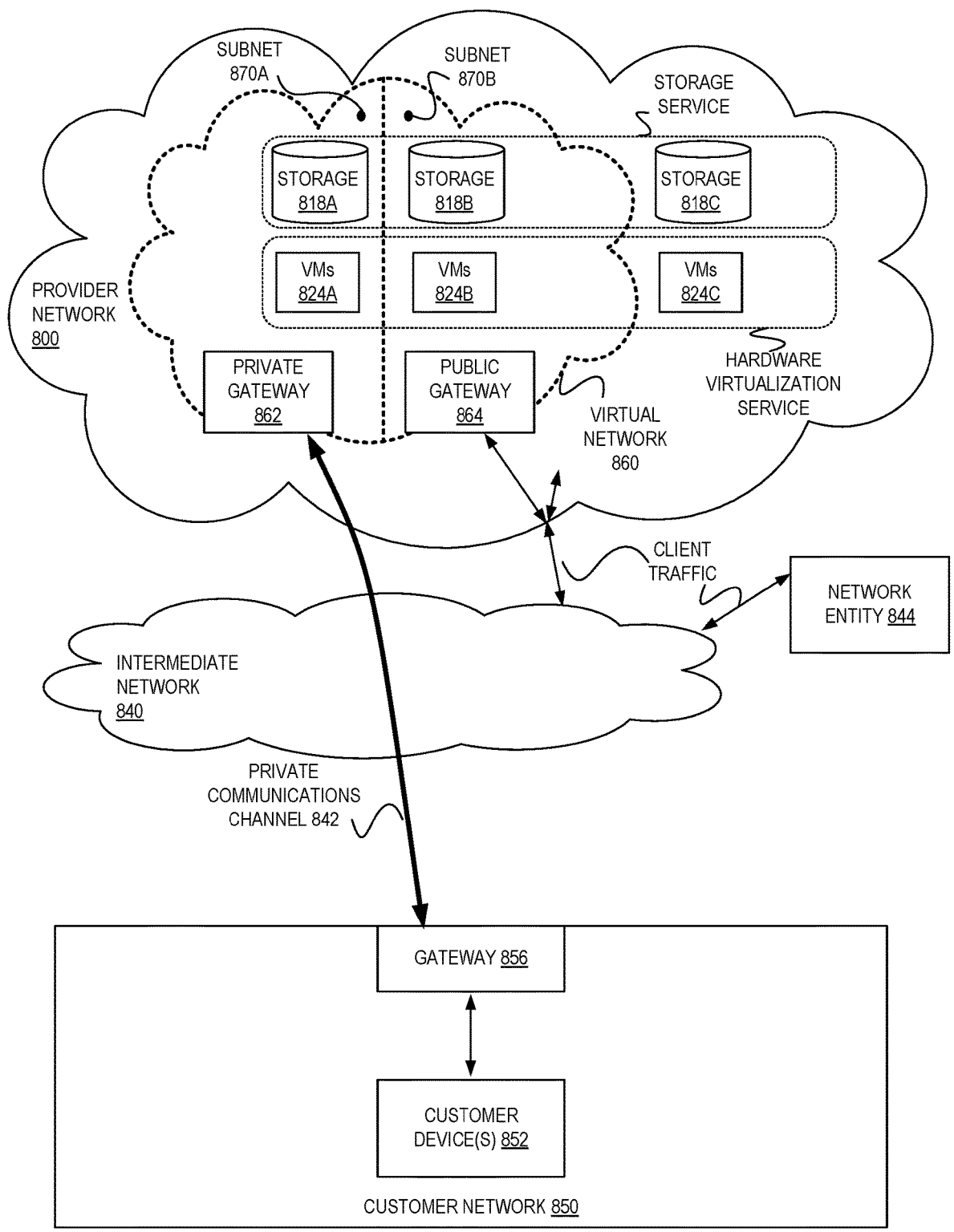
FIG. 8 illustrates an example provider network that provides virtual networks on the provider network to at least some customers according to some embodiments.

FIG. 8 illustrates an example service provider network that provides virtual networks on the provider network to users according to some embodiments. A user's virtual network 860 at a service provider network 800, for example, enables a user to connect their existing infrastructure (for example, one or more customer devices 852) on user network 850 to a set of logically isolated resource instances (for example, VMs 824A and 824B and storage 818A and 818B), and to extend management capabilities such as security services, firewalls, and intrusion detection systems to include their resource instances.

A user's virtual network 860 may be connected to a user network 850 via a private communications channel 842. A private communications channel 842 may, for example, be a tunnel implemented according to a network tunneling technology or some other technology over an intermediate network 840. In some examples, the intermediate network is a shared network or a public network such as the Internet. Alternatively, a private communications channel 842 is implemented over a direct, dedicated connection between virtual network 860 and user network 850.

A public network is broadly defined as a network that provides open access to and interconnectivity among a plurality of entities. The internet, or World Wide Web (WWW) is an example of a public network. A shared network is broadly defined as a network to which access is limited to two or more entities, in contrast to a public network to which access is not generally limited. A shared network, for example, can include one or more local area networks (LANs) and/or data center networks, or two or more LANs or data center networks that are interconnected to form a wide area network (WAN). Examples of shared networks include, but are not limited to, corporate networks and other enterprise networks. A shared network can be anywhere in scope from a network that covers a local area to a global network. Note that a shared network can share at least some network infrastructure with a public network, and that a shared network can be coupled to one or more other networks, which may include a public network, with controlled access between the other network(s) and the shared network. A shared network can also be viewed as a private network, in contrast to a public network such as the internet. In some embodiments, either a shared network or a public network serves as an intermediate network between a provider network and a customer network.

To establish a virtual network 860 for a user on service provider network 800, one or more resource instances (for example, VMs 824A and 824B and storage 818A and 818B) are allocated to the virtual network 860. Note that other resource instances (for example, storage 818C and VMs 824C) may remain available on the service provider network 800 for other customer usage. A range of public IP addresses can also be allocated to the virtual network 860. In addition, one or more networking nodes (for example, routers, switches, and so forth) of the provider network 800 can be allocated to the virtual network 860. A private communications channel 842 can be established between a private gateway 862 at virtual network 860 and a gateway 856 at customer network 850.

In some embodiments, in addition to, or instead of, a private gateway 862, virtual network 860 includes a public gateway 864 that enables resources within virtual network 860 to communicate directly with entities (for example, network entity 844) via intermediate network 840, and vice versa, instead of or in addition to via private communications channel 842.

A virtual network 860 can be optionally subdivided into two or more subnetworks, or subnets, 870. For example, in implementations that include both a private gateway 862 and a public gateway 864, a virtual network 860 can be subdivided into a subnet 870A that includes resources (VMs 824A and storage 818A, in this example) reachable through private gateway 862, and a subnet 870B that includes resources (VMs 824B and storage 818B, in this example) reachable through public gateway 864.

A user can assign allocated public IP addresses to resource instances in virtual network 860. A network entity 844 on intermediate network 840 can then send traffic to a public IP address published by the user; the traffic is routed, by the provider network 800, to the associated resource instance. Return traffic from the resource instance is routed, by the provider network 800, back to the network entity 844 over intermediate network 840. Note that routing traffic between a resource instance and a network entity 844 may require network address translation to translate between the public IP address and the local IP address of the resource instance.

Some embodiments allow users to remap public IP addresses in a user's virtual network 860 as illustrated in FIG. 8 to devices on the user's external network 850. When a packet is received (for example, from network entity 844) and the network 800 determines that the destination IP address indicated by the packet has been remapped to an endpoint on external network 850, the network handles routing of the packet to the respective endpoint either via private communications channel 842 or via the intermediate network 840. Response traffic is then routed from the endpoint to the network entity 844 through the provider network 800, or alternatively directly routed to the network entity 844 by the user network 850. From the perspective of the network entity 844, it appears as if the network entity 844 is communicating with the public IP address of the user on the provider network 800. However, the network entity 844 has actually communicated with the endpoint on customer network 850.

While FIG. 8 shows network entity 844 on intermediate network 840 and external to provider network 800, a network entity can be an entity on service provider network 800. For example, one of the resource instances provided by provider network 800 can be a network entity that sends traffic to a public IP address published by the customer.

Figure 9:
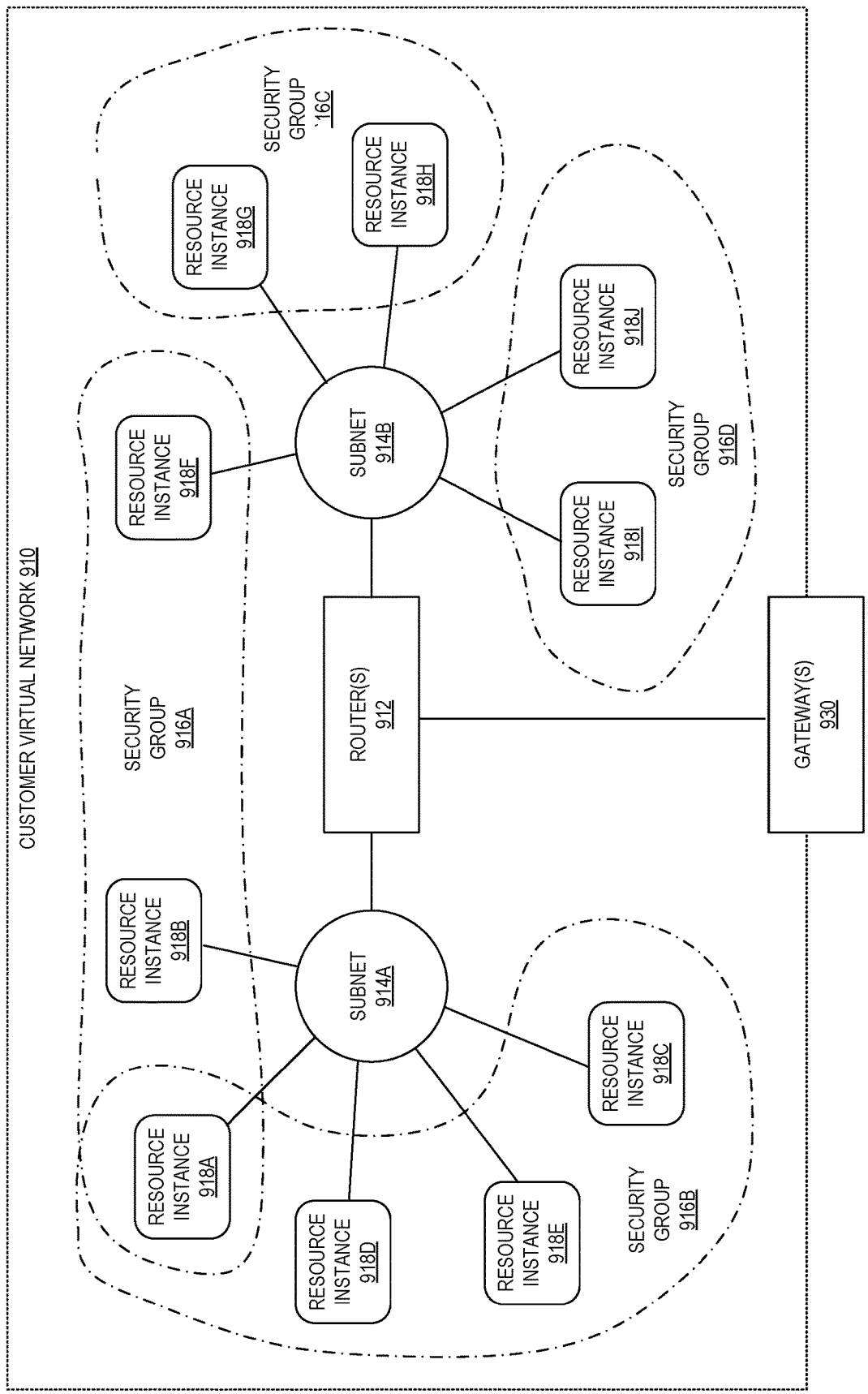
FIG. 9 illustrates subnets and security groups in an example virtual network on a provider network according to some embodiments.

FIG. 9 illustrates subnets and security groups in an example virtual network 910 on a service provider network according to some embodiments. In some embodiments, a service provider network such as provider network 800 in FIG. 8 allows the customer to establish and manage virtual security groups 916 (for example, 916A-916D) within the user's virtual network 910, within or across subnets 914. A security group 916 is a logical grouping of resource instances 918 and acts as a virtual firewall that controls the traffic allowed to reach one or more resource instances 918 within the security group 916 according to security group rules. A user can establish one or more security groups 916 within the virtual network 910 and can associate resource instances 918 in the virtual network 910 with one or more of the security groups 916. In some embodiments, the user establishes and/or modifies rules for each security group 916 that control the inbound traffic allowed to reach the resource instances 918 associated with the security group 916.

In the example virtual network 910 shown in FIG. 9, the virtual network 910 is subdivided into two subnets 914A and 914B. Access to the virtual network 910 is controlled by gateway(s) 930. Each subnet 914 can include at least one router 912 that acts to route traffic to (and from) resource instances 918 on the respective subnet 914. In some embodiments, network access control lists (ACLs) are used to control access to the subnets 914 at router(s) 912. In the example shown in FIG. 9, resource instances 918A through 918E are on subnet 914A and resource instances 918F through 918J are on subnet 914B. The user has established four security groups 916A through 916D. As shown in FIG. 9, a security group can extend across subnets 914, as does security group 916A that includes resource instances 918A and 918B on subnet 914A and resource instance 918F on subnet 914B. In addition, a resource instance 918 can be included in two or more security groups 916, as is resource instance 918A which is included in security group 916A and 916B.

Figure 10:
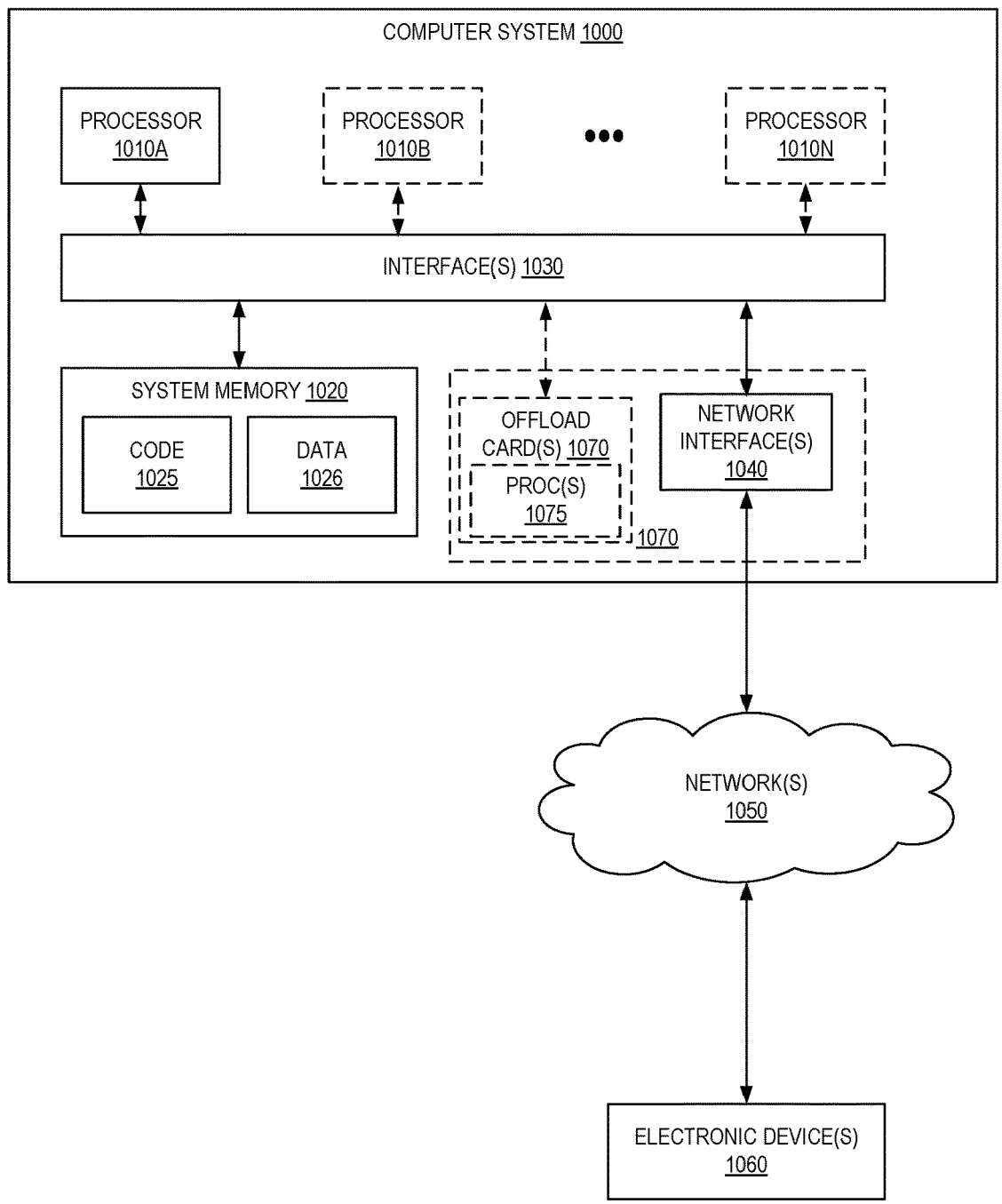
FIG. 10 is a block diagram illustrating an example computer system that may be used in some embodiments.

In some embodiments, a system that implements a portion or all of the techniques for enabling users to configure the mirroring of network traffic sent to or received by computing resources associated with a virtual network of computing resources at a service provider network as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method for mirroring network traffic within a cloud provider network, the method comprising:
   receiving a request to mirror the network traffic, wherein the request identifies:
      a network load balancer to which a mirrored copy of the network traffic is to be sent, wherein the network load balancer is associated with a fleet of compute instances configured to process the mirrored copy of the network traffic, and
      a network traffic filtering option;
   generating the mirrored copy of the network traffic based at least in part on the network traffic filtering option, wherein the mirrored copy of the network traffic is a subset of the network traffic, and wherein a compute instance of the fleet of compute instances converts the mirrored copy of the network traffic into a packet capture data format stored in one or more packet capture files;
   sending the mirrored copy of the network traffic to the network load balancer; and
   scaling a size of the fleet of compute instances based on an amount of the mirrored copy of the network traffic received by the fleet of compute instances via the network load balancer.

2. The computer-implemented method for mirroring network traffic within the cloud provider network of claim 1, further comprising:
receiving an additional request to perform an action including at least one of:
stopping mirroring of the network traffic, or
resuming mirroring of the network traffic.

3. The computer-implemented method for mirroring network traffic within the cloud provider network of claim 1, wherein the fleet of compute instances is connected to one or more storage locations provided by a storage service of the cloud provider network.

4. The computer-implemented method for mirroring network traffic within the cloud provider network of claim 1, wherein the network traffic filtering option indicates that the network traffic is to be filtered based on at least one of:
inbound network traffic, or
outbound network traffic.

5. The computer-implemented method for mirroring network traffic within the cloud provider network of claim 1, wherein the request to mirror the network traffic identifies a virtual network interface.

6. The computer-implemented method for mirroring network traffic within the cloud provider network of claim 5, wherein the virtual network interface is one of a group of virtual network interfaces.

7. The computer-implemented method for mirroring network traffic within the cloud provider network of claim 1, wherein a compute instance of the fleet of compute instances adds metadata to the mirrored copy of the network traffic.

8. The computer-implemented method for mirroring network traffic within the cloud provider network of claim 1, wherein the fleet of compute instances receives mirrored network traffic from computing devices hosting computing resources associated with a plurality of different users of the cloud provider network.

9. The computer-implemented method for mirroring network traffic within the cloud provider network of claim 1, wherein the request further specifies a time limit for generating the mirrored copy of the network traffic.

10. The computer-implemented method for mirroring network traffic within the cloud provider network of claim 1, further comprising:
receiving a query including search criteria identifying a subset of data stored by the fleet of compute instances based on the mirrored copy of the network traffic; and
executing the query against the query against the data stored by the fleet of compute instances.

11. The computer-implemented method for mirroring network traffic within the cloud provider network of claim 1, further comprising receiving an additional request to perform an action including modifying mirroring of the network traffic.

12. The computer-implemented method for mirroring network traffic within the cloud provider network of claim 1, wherein the network traffic filtering option indicates that the network traffic is to be filtered based on at least network traffic associated with one or more specified network protocols.

13. The computer-implemented method for mirroring network traffic within the cloud provider network of claim 1, wherein the network traffic filtering option indicates that the network traffic is to be filtered based on at least one of:
network traffic associated with one or more specified source ports; or
network traffic to be sent to one or more specified destination ports.

14. The computer-implemented method for mirroring network traffic within the cloud provider network of claim 1, wherein the network traffic filtering option indicates that the network traffic is to be filtered based on at least network traffic to be sent to one or more specified destination IP ranges.

15. The computer-implemented method for mirroring network traffic within the cloud provider network of claim 1, wherein scaling the fleet of compute instances includes the network load balancer associating with one or more additional compute instances.

16. The computer-implemented method for mirroring network traffic within the cloud provider network of claim 1, wherein scaling the fleet of compute instances includes the network load balancer associating with one or more fewer compute instances.

17. The computer-implemented method for mirroring network traffic within the cloud provider network of claim 1, wherein generating the mirrored copy of the network traffic based at least in part on the network traffic filtering option comprises:
extracting one or more pieces of information from one or more packet headers associated with one or more packets from the network traffic;
checking the one or more pieces of information from the one or more packet headers against a condition set by the network traffic filtering option; and
determining whether to generate a mirrored copy of the one or more packets based at least in part on whether a match exists between the one or more pieces of information and the condition set by the network traffic filtering option.

18. The computer-implemented method for mirroring network traffic within the cloud provider network of claim 1, further comprising performing forensic or security analysis on the mirrored copy of the network traffic received by the fleet of compute instances or on information based at least in part on the mirrored copy of the network traffic received by the fleet of compute instances.

19. A system for mirroring network traffic within a cloud provider network, the system comprising:
a first one or more electronic devices to implement a hardware virtualization service of the cloud provider network, wherein the hardware virtualization service includes instructions that upon execution cause the hardware virtualization service to:
receive a request to mirror the network traffic, wherein the request identifies:
a network load balancer to which a mirrored copy of the network traffic is to be sent, wherein the network load balancer is associated with a fleet of compute instances configured to process the mirrored copy of the network traffic, and
a network traffic filtering option;
generate the mirrored copy of the network traffic based at least in part on the network traffic filtering option, wherein the mirrored copy of the network traffic is a subset of the network traffic, and wherein a compute instance of the fleet of compute instances converts the mirrored copy of the network traffic into a packet capture data format stored in one or more packet capture files;
send the mirrored copy of the network traffic to the network load balancer; and
scale a size of the fleet of compute instances based on an amount of the mirrored copy of the network traffic received by the fleet of compute instances via the network load balancer; and a second one or more electronic devices to implement the fleet of compute instances, wherein the fleet of compute instances includes instructions that upon execution cause the fleet of compute instances to:
receive the mirrored copy of the network traffic, and
send the mirrored copy of the network traffic to another component.

20. The system for mirroring network traffic within the cloud provider network of claim 19, wherein the hardware virtualization service further includes instructions that upon execution cause the hardware virtualization service to:
receive an additional request to perform an action including at least one of:
stopping mirroring of the network traffic, or
resuming mirroring of the network traffic.

21. The system for mirroring network traffic within the cloud provider network of claim 19, wherein the fleet of compute instances is connected to one or more storage locations provided by a storage service of the cloud provider network.

22. The system for mirroring network traffic within the cloud provider network of claim 19, wherein the network traffic filtering option indicates that network traffic is to be filtered based on at least one of:
inbound network traffic, or
outbound network traffic.

23. The system for mirroring network traffic within the cloud provider network of claim 19, wherein the request to mirror the network traffic identifies a virtual network interface.

24. The system for mirroring network traffic within the cloud provider network of claim 23, wherein the virtual network interface is one of a group of virtual network interfaces.

25. The system for mirroring network traffic within the cloud provider network of claim 19, wherein a compute instance of the fleet of compute instances adds metadata to the mirrored copy of the network traffic.

26. The system for mirroring network traffic within the cloud provider network of claim 19, wherein the fleet of compute instances receives mirrored network traffic from computing devices hosting computing resources associated with a plurality of different users of the cloud provider network.

27. The system for mirroring network traffic within the cloud provider network of claim 19, wherein the request further specifies a time limit for generating the mirrored copy of the network traffic.

28. The system for mirroring network traffic within the cloud provider network of claim 19, wherein the hardware virtualization service further includes instructions that upon execution cause the hardware virtualization service to:
receive a query including search criteria identifying a subset of data stored by the fleet of compute instances based on the mirrored copy of the network traffic; and
execute the query against the query against the data stored by the fleet of compute instances.

29. The system for mirroring network traffic within the cloud provider network of claim 19, wherein the hardware virtualization service further includes instructions that upon execution cause the hardware virtualization service to receive an additional request to perform an action including modifying mirroring of the network traffic.

30. The system for mirroring network traffic within the cloud provider network of claim 19, wherein the network traffic filtering option indicates that the network traffic is to be filtered based on at least network traffic associated with one or more specified network protocols.

31. The system for mirroring network traffic within the cloud provider network of claim 19, wherein the network traffic filtering option indicates that the network traffic is to be filtered based on at least one of:
network traffic associated with one or more specified source ports; or
network traffic to be sent to one or more specified destination ports.

32. The system for mirroring network traffic within the cloud provider network of claim 19, wherein the network traffic filtering option indicates that the network traffic is to be filtered based on at least network traffic to be sent to one or more specified destination IP ranges.

33. The system for mirroring network traffic within the cloud provider network of claim 19, wherein scaling the fleet of compute instances includes the network load balancer associating with one or more additional compute instances.

34. The system for mirroring network traffic within the cloud provider network of claim 19, wherein scaling the fleet of compute instances includes the network load balancer associating with one or more fewer compute instances.

35. The system for mirroring network traffic within the cloud provider network of claim 19, wherein to generate the mirrored copy of the network traffic based at least in part on the network traffic filtering option, the hardware virtualization service is to:
extract one or more pieces of information from one or more packet headers associated with one or more packets from the network traffic;
check the one or more pieces of information from the one or more packet headers against a condition set by the network traffic filtering option; and
determine whether to generate a mirrored copy of the one or more packets based at least in part on whether a match exists between the one or more pieces of information and the condition set by the network traffic filtering option.

36. The system for mirroring network traffic within the cloud provider network of claim 19, wherein the hardware virtualization service further includes instructions that upon execution cause the hardware virtualization service to perform forensic or security analysis on the mirrored copy of the network traffic received by the fleet of compute instances or on information based at least in part on the mirrored copy of the network traffic received by the fleet of compute instances.

* * * * *